(12) United States Patent
Sagiv et al.

(10) Patent No.: US 10,060,736 B1
(45) Date of Patent: Aug. 28, 2018

(54) NEAR-FIELD SENSOR HEIGHT CONTROL

(71) Applicant: APPLIED MATERIALS ISRAEL LTD., Rehovot (IL)

(72) Inventors: Amir Moshe Sagiv, Beit-Zayit (IL); Yoram Uziel, Misgav (IL); Haim Feldman, Nof-Ayalon (IL); Ron Naftali, Shoham (IL)

(73) Assignee: Appled Materials Israel Ltd., Rehovot (IL)

( * ) Notice: Subject to any disclaimer, the term of this patent is extended or adjusted under 35 U.S.C. 154(b) by 286 days.

(21) Appl. No.: 15/134,771

(22) Filed: Apr. 21, 2016

(51) Int. Cl.
    G01B 15/00 (2006.01)
(52) U.S. Cl.
    CPC .................................. G01B 15/00 (2013.01)
(58) Field of Classification Search
    CPC ...................................................... G01B 15/00
    See application file for complete search history.

(56) References Cited

U.S. PATENT DOCUMENTS 9,766,551 B2 * 9/2017 Mirkin .................. G03F 7/7035

\* cited by examiner

*Primary Examiner* — Dani Fox
(74) *Attorney, Agent, or Firm* — Kilpatrick Townsend & Stockton LLP

(57) ABSTRACT

A method for determining a distance between a near field sensor and a substrate, the method may include creating a diffraction pattern by illuminating, with a beam of coherent radiation having a wavelength that does not exceed twenty nanometers, a slit that is formed between the substrate and an opaque element; detecting, by a detector, multiple portions of the diffraction pattern and generating detection signals indicative of the multiple portions of the diffraction pattern; processing the detection signals to determine a height of the slit; and determining the distance between the near field sensor and the substrate based upon (a) the height of the slit, and (b) a relationship between the height of the slit and a location of the near field sensor.

15 Claims, 8 Drawing Sheets

```
┌─────────────────────────────────────────────────────────────────────┐
│ Creating a diffraction pattern by illuminating, with a beam of      │
│ coherent radiation having a wavelength that does not exceed twenty  │
│ nanometers, a slit formed between the substrate and an opaque       │
│ element. 110                                                        │
└─────────────────────────────────────────────────────────────────────┘
                                    │
                                    ▼
┌─────────────────────────────────────────────────────────────────────┐
│ Detecting by a detector multiple portions of the diffraction        │
│ pattern and generating detection signals indicative of the multiple │
│ portions of the diffraction pattern. 120                            │
└─────────────────────────────────────────────────────────────────────┘
                                    │
                                    ▼
┌─────────────────────────────────────────────────────────────────────┐
│ Processing the detection signals to determine a height of the slit. │
│ 130                                                                 │
└─────────────────────────────────────────────────────────────────────┘
                                    │
                                    ▼
┌─────────────────────────────────────────────────────────────────────┐
│ Determining the distance between the near field sensor and the      │
│ substrate based upon (a) the height of the slit, and (b) a          │
│ relationship between the height of the slit and a location of the   │
│ near field sensor. 140                                              │
└─────────────────────────────────────────────────────────────────────┘
```

NEAR-FIELD SENSOR HEIGHT CONTROL

BACKGROUND

A major concern of near field sensors is the distance between the substrate under investigation and the near field sensor. This is an unavoidable consequence of the working principle underlying near field optics, as the advantage of the near field sensor lies in the sensitivity of the near field sensor to evanescent modes that exist only close to the surface of the substrate.

These evanescent modes die out exponentially fast over a fraction of a wavelength as the near field sensor recedes from the sample.

Thus, at visible to deep ultra violet (UV) wavelengths, near field sensor height control at the range of 1 nanometer scale is required. In contrast, in ordinary high numerical aperture optical settings, the typical height tolerance is the depth of focus, of order of the wavelength.

A significant caveat of traditional height measurement techniques (such as optical interferometry and optical wavefront sensing) is their inherent sensitivity to both the material and the three dimensional pattern geometry of the measured substrate.

When the material and/or three dimensional pattern geometry change across the substrate, the amplitude and phase of reflected waves will change accordingly, and will affect, in turn, the diffraction pattern used for height measurement. Analogous arguments pertain to electrical capacitive measurements.

There is a growing need to provide robust height measurements.

SUMMARY

According to an embodiment of the invention there may be provided a method for determining a distance between a near field sensor and a substrate, the method may include creating a diffraction pattern by illuminating, with a beam of coherent radiation having a wavelength that does not exceed twenty nanometers, a slit that is formed between the substrate and an opaque element; detecting, by a detector, multiple portions of the diffraction pattern and generating detection signals indicative of the multiple portions of the diffraction pattern; processing the detection signals to determine a height of the slit; and determining the distance between the near field sensor and the substrate based upon (a) the height of the slit, and (b) a relationship between the height of the slit and a location of the near field sensor.

According to an embodiment of the invention there may be provided a measurement device that may include a near field sensor; an opaque element; and a height measurement module; wherein the height measurement module may be configured to create a diffraction pattern by illuminating, with a beam of coherent radiation having a wavelength that does not exceed twenty nanometers, a slit formed between a substrate and the opaque element; detect multiple portions of the diffraction pattern; generate detection signals that are indicative of the multiple portions of the diffraction pattern; process the detection signals to determine a height of the slit; and determine a distance between the near field sensor and the substrate based upon (a) the height of the slit, and (b) a relationship between the height of the slit and a location of the near field sensor.

The beam of coherent radiation may be an x-ray beam.

The generating of the detection signals may include generating multiple detection signals for the multiple portions of the diffraction lobe.

The height measurement module may be configured to generate multiple detection signals for the multiple portions of the diffraction lobe.

The processing of the detection signals may include comparing between detection signals related to different portions of the diffraction lobe.

The height measurement module may be configured to compare between detection signals related to different portions of the diffraction lobe.

The diffraction lobe may be a main diffraction lobe of the diffraction pattern.

The multiple portions of the diffraction pattern may be sensed by multiple sensing elements, wherein two or more sensing elements of the multiple sensing elements may cover different reflection angular ranges.

The height of the slit may range between 20 and 150 nanometers.

The incidence angle of the beam of coherent radiation may not exceed two degrees.

The incidence angle of the beam of coherent radiation may be smaller than a minimal total internal reflection angle for all materials of the substrate.

The method may include controlling a height of the near field sensor in response to the distance between the near field sensor and the substrate.

The measurement device may include a controller that may be arranged to control a height of the near field sensor in response to the distance between the near field sensor and the substrate.

BRIEF DESCRIPTION OF THE DRAWINGS

The subject matter regarded as the invention is particularly pointed out and distinctly claimed in the concluding portion of the specification. The invention, however, both as to organization and method of step, together with objects, features, and advantages thereof, may best be understood by reference to the following detailed description when read with the accompanying drawings in which:

FIG. 7 illustrates a method according to an embodiment of the invention; and

Figure 1:
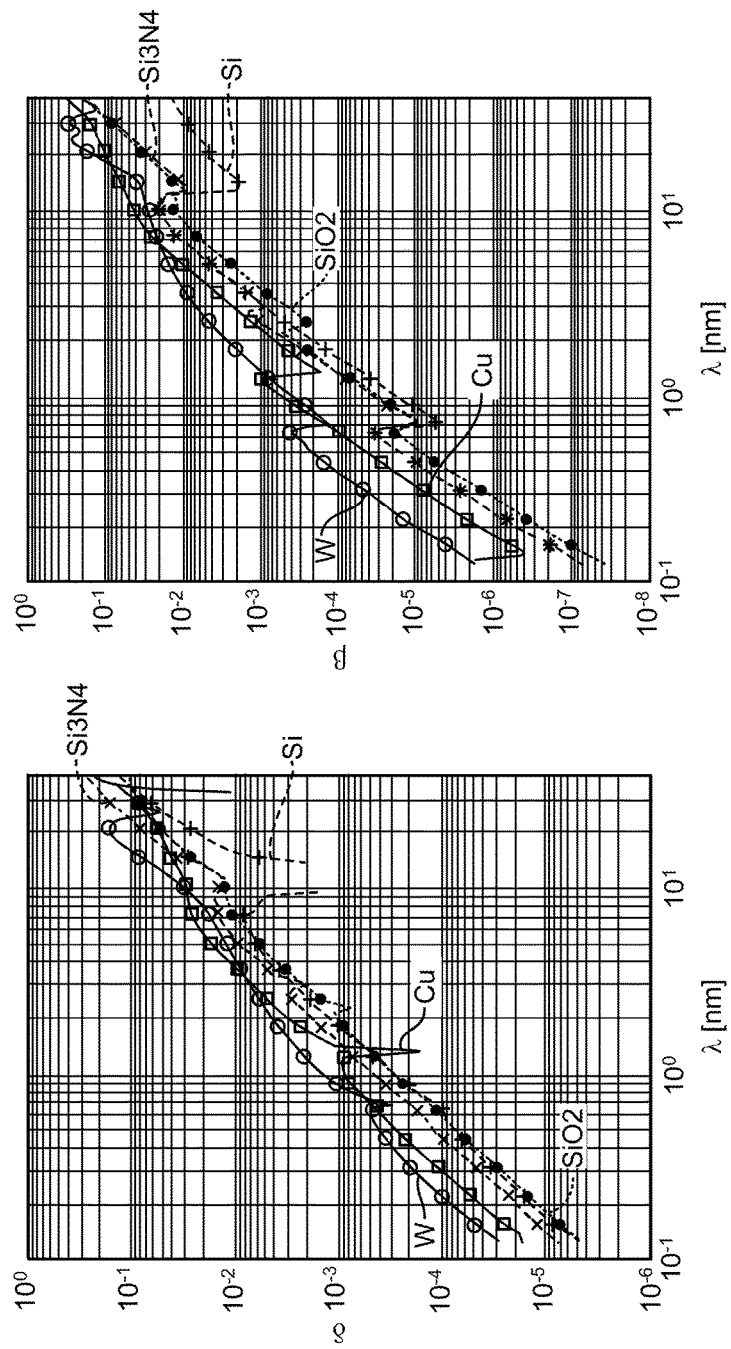
FIG. 1 illustrates various refractive index parameters.

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following description relates to the creation of interference patterns of a coherent beam of a given radiation that has a wavelength that does not exceed twenty nanometers.

Beams of the given radiation have frequencies that exceed ten by the power of seventeen (100,000,000,000,000,000) Hz—that well exceed the plasma frequency of practically all common materials, including all materials used in the semiconductor industry and all organic substances (which is on the order of ten by the power of fifteen Hz).

For simplicity of explanation it is assumed that the given radiation is x-ray radiation and that the coherent beam of given radiation is a coherent x-ray beam.

The coherent x-ray beam has a frequency that is above (and especially well above) the plasma frequency of the substrate. In such situations, the refractive index of the substrate behaves as $n(\mu)=1-\delta-i\beta$, where $\delta$ and $\beta$ are positive numbers that depend on the frequency, and are much smaller than 1.

Representative values of $\delta$ and $\beta$ (y-axis) versus wavelength (x-axis) are plotted in graphs 11 and 12 of FIG. 1. The five curves per each graph are attributed to five different materials—W, Cu, Si, Si3N4, Cu and SiO2. Notice that the real part of the refractive index is smaller than 1 (as $\delta$ is small but positive).

A coherent x-ray beam that is illuminated at a grazing angle is relatively insensitive to the material of the substrate and to the three dimensional pattern geometry of the substrate.

The incidence angle of the coherent x-ray beam is selected to be smaller than the total internal reflection ($\theta_{TIR}$) for any material of the substrate.

Figure 2:
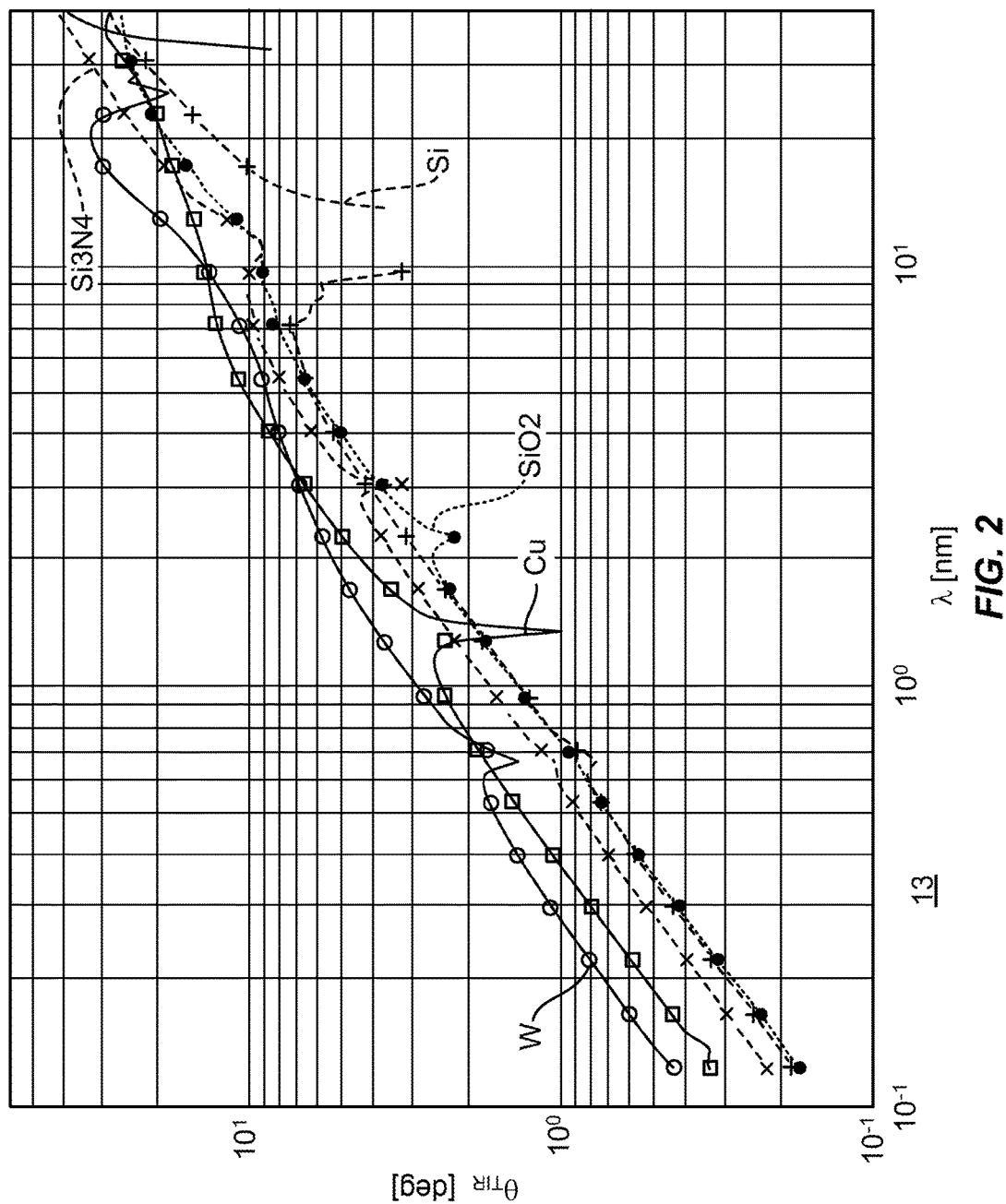
FIG. 2 illustrates the relationship between wavelength to total internal reflection angle.

FIG. 2 includes graph 13 that illustrates the relationship between wavelength (x-axis) to total internal reflection angle (y-axis). It is noted that the internal reflection angle is measured relative to the substance' surface, in order to highlight the fact that grazing angles above the surface are required. Graph 13 has five curves that are attributed to five different materials—W, Cu, Si, Si3N4, Cu and SiO2.

Specifically, if the coherent x-ray beam is incident from air onto a sample, with an angle $\theta<\theta_{TIR}\approx\sqrt{2\delta}$ above the horizon, then this radiation is fully reflected back into air.

Figure 3:
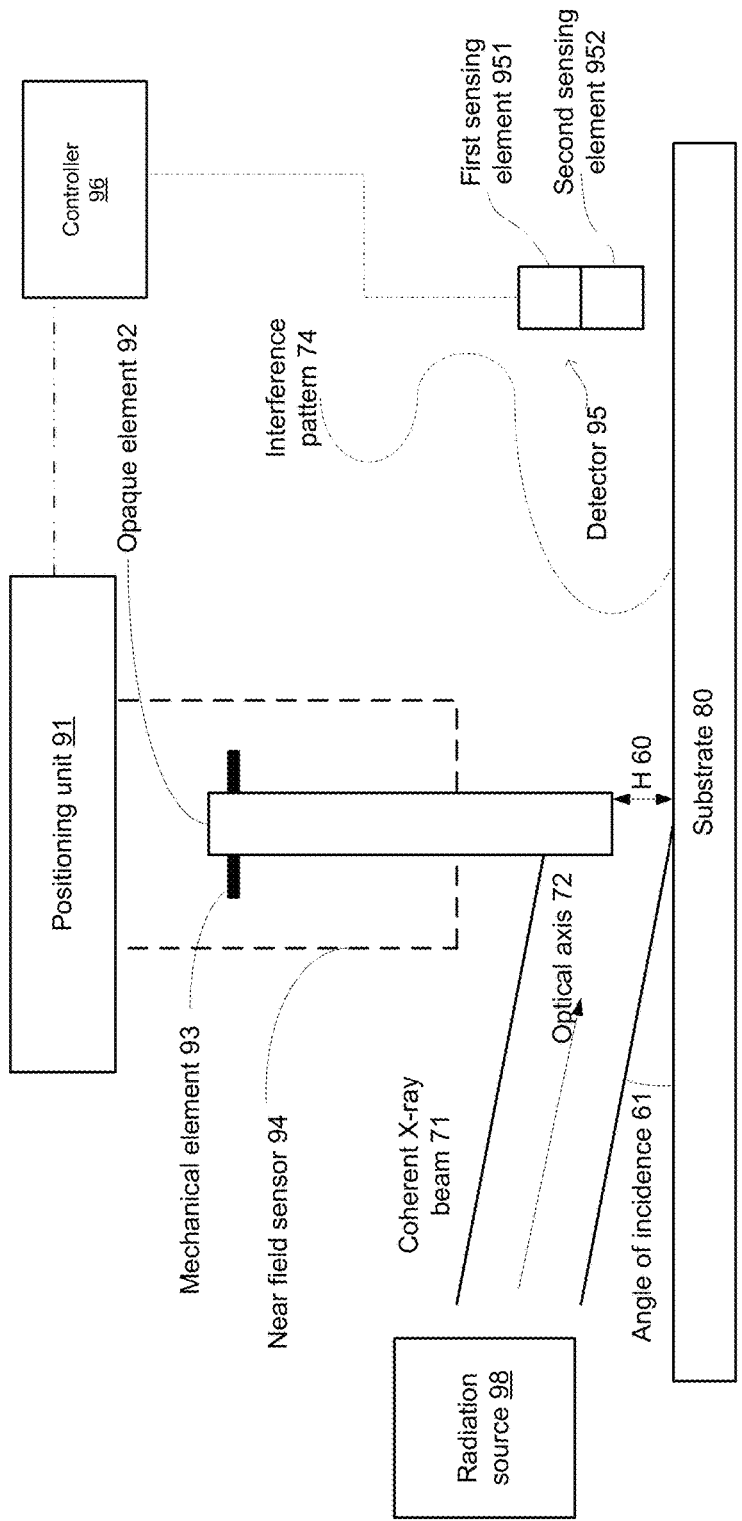
FIG. 3 illustrates a substrate, a positioning unit, an opaque element, a mechanical element, a near field sensor, a detector and a controller according to an embodiment of the invention.

FIG. 3 illustrates substrate 80, positioning unit 91, opaque element 92, mechanical element 93, near field sensor 94, detector 95 having first and second sensing elements 951 and 951, and a controller 96 according to an embodiment of the invention.

Figure 4:
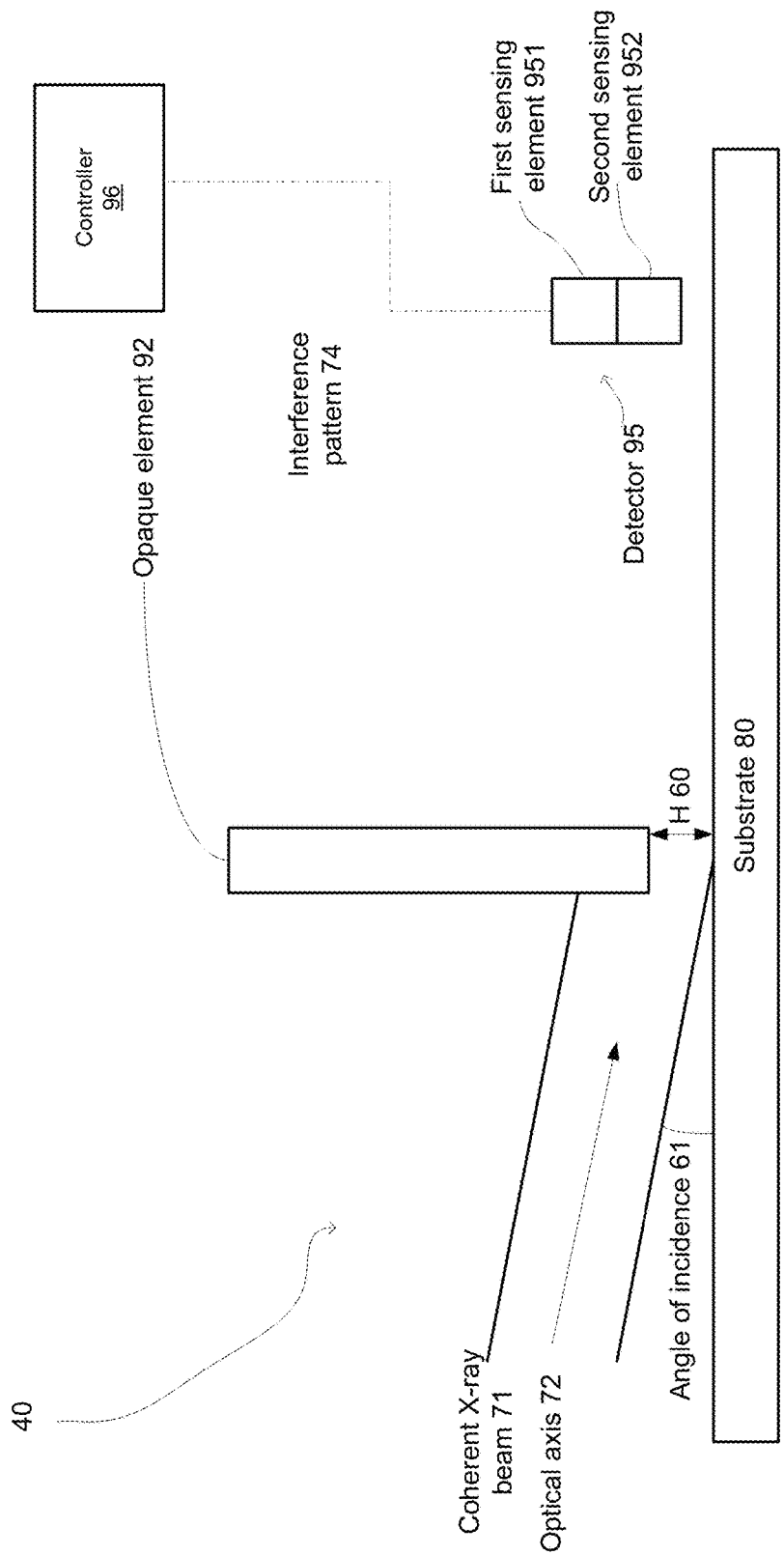
FIG. 4 illustrates a substrate and a height measurement module according to an embodiment of the invention.

FIG. 4 illustrates substrate 80 and a height measurement module 40 that includes opaque element 92, detector 95 having first and second sensing elements 951 and 952 and a radiation source.

The opaque element 92 is opaque in the sense that it absorbs most and even substantially all of the x-ray radiation that impinges on it. A one to ten micron gold plate is opaque enough.

Near field sensor 94 is illustrated in FIG. 3 as being behind opaque element 92. The near field sensor 94 is mechanically coupled (via mechanical element 93) to the opaque element 92 in order to maintain a fixed relationship between the bottom of the opaque element 92 and the bottom of the near field sensor 94. The mechanical element 93 may include a rod, a plate, or any other type of mechanical element.

The positioning unit 91 may change the distance between the near field sensor 94 and the opaque element 92 to the substrate—for example in order to position the near field sensor 94 at a desired distance from the substrate. The positioning unit 91 may be a z-axis stage.

A slit of a height H 60 of nanometric scale (for example—between 20 and 150 nanometer or otherwise proximate to a desired height). When the slit is of the desired height the near field sensor 94 is at a desired distance from the substrate.

Coherent x-ray beam 71 (having an optical axis 72) illuminates the slit and a part of the opaque element 92 thereby forming diffraction pattern 74. Some portions of the diffraction pattern are detected by first sensing element and second sensing element 951 and 952 of detector 95. Each sensing element is capable of generating its own detection signals.

It should be noted that detector 95 may have a single sensing element, three or more sensing elements. The sensing elements may differ by shape, by size or may have the same shape and/or size.

The shape of the diffraction pattern as a function of angle above the horizon is sensitive to the height of the slit—the exact distance between the surface and the bottom of the opaque element, thus enabling very accurate height measurement.

The coherent x-ray beam is coherent in the sense that a coherence length of the coherent x-ray beam exceeds the height of the slit.

The detection signals of detector 95 are sent to controller 96 that processes the detection signals to determine the height of the slit—and to infer the height of the near field sensor. Controller 96 may send control signals to positioning unit 91 for positioning the near field sensor 94 at a desired height.

Controller may include a hardware controller and/or a hardware processor. It may include general purpose processors, image processors, and the like.

Figure 5:
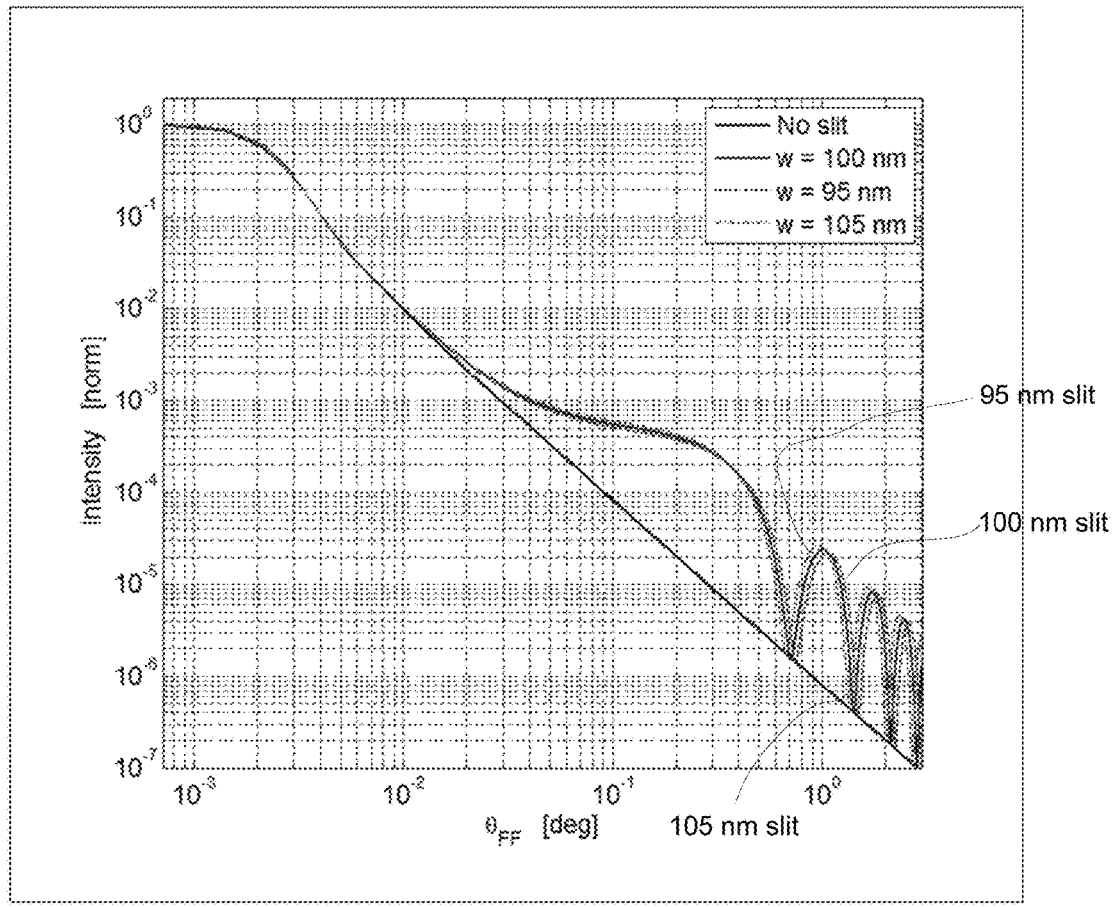
FIG. 5 illustrates a normalized intensity of the radiation versus the angle of collection for three different slits according to an embodiment of the invention.

FIG. 5 includes graph 14 that plots a normalized intensity of the radiation (y-axis) versus the angle of collection (x-axis) for slits of 95 nm, 100 nm and 105 nm. There are differences between the curves. These differences can be sensed and used to provide a nanometric accuracy height measurement.

Figure 6:
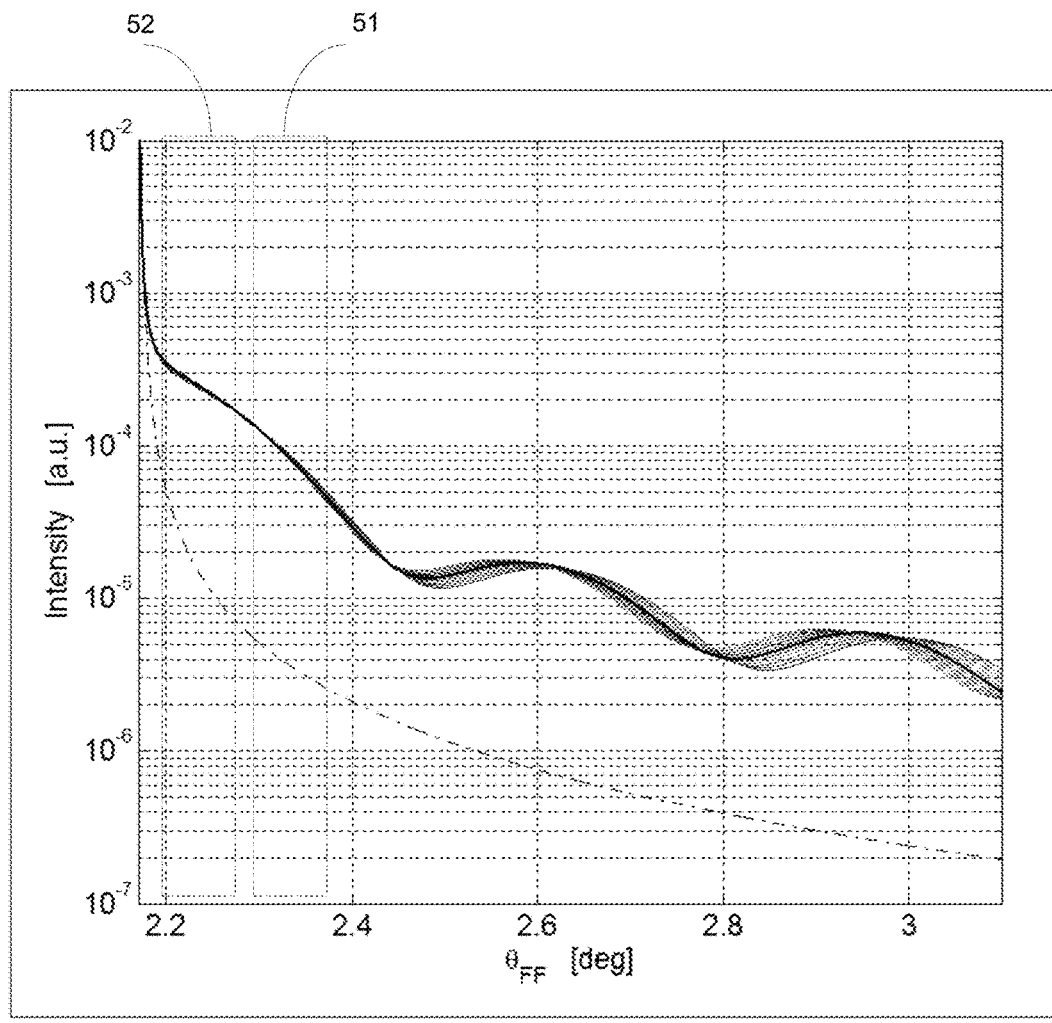
FIG. 6 illustrates a normalized intensity of the radiation versus the angle of collection for three different slits according to an embodiment of the invention.

FIG. 6 includes graph 15 that plots a normalized intensity of the radiation (y-axis) versus the angle of collection (x-axis) for slits of different heights. FIG. 6 focuses on a smaller incidence angle range (between about 2.2 and about three degrees). FIG. 6 also illustrates the fields of view 52 and 51 covered by second sensing element 952 and first sensing element 951 respectively.

There are differences between the curves associated with slits of different height. These differences can be sensed and used to provide a nanometric accuracy height measurement.

It has been found that measuring the ratio between the integrated intensities in two angular ranges (such as those included in field of view 51 and field of view 52) enables measurement of about one nanometer changes in the height of the slit at reasonable signal to noise ratio.

As indicated above—the illumination angle θ is chosen such that it is smaller than the minimal total internal reflection angle for all materials relevant to the problem. For example, if the application is semiconductor metrology, and the coherent x-ray beam has a wavelength of 1 nm and a given normalized energy Eph' (normalized by 1 KeV), then the incidence angle should not exceed 2*Eph' degrees.

FIG. 7 illustrates method 100 according to an embodiment of the invention.

Method 100 may start by step 110 of creating a diffraction pattern by illuminating, with a beam of coherent radiation having a wavelength that does not exceed 20 nanometers, a slit formed between the substrate and an opaque element.

Step 110 may be followed by step 120 of detecting by a detector at least two portion of the diffraction pattern and generating detection signals indicative of the multiple portions of the diffraction pattern.

Step 120 may include generating multiple detection signals for the multiple portions of a diffraction lobe. The diffraction lobe may be the main (zeroth order) diffraction lobe or another diffraction lobe.

Step 120 may include detecting multiple portions of a diffraction pattern by multiple sensing elements. Two or more sensing elements of the multiple sensing elements cover different reflection angular ranges Step 120 may be followed by step 130 of processing the detection signals to determine a height of the slit.

Step 130 may include comparing between detection signals related to different portions of the main diffraction lobe.

Step 130 may be followed by step 140 determining the distance between the near field sensor and the substrate based upon (a) the height of the slit, and (b) a relationship between the height of the slit and a location of the near field sensor.

Steps 110, 120, 130 and 140 may be executed while the opaque element and the near field sensor scan the substrate 80 to provide an on-the-fly height measurement. The height measurement may be used to position the near field sensor at the desired height.

Figure 8:
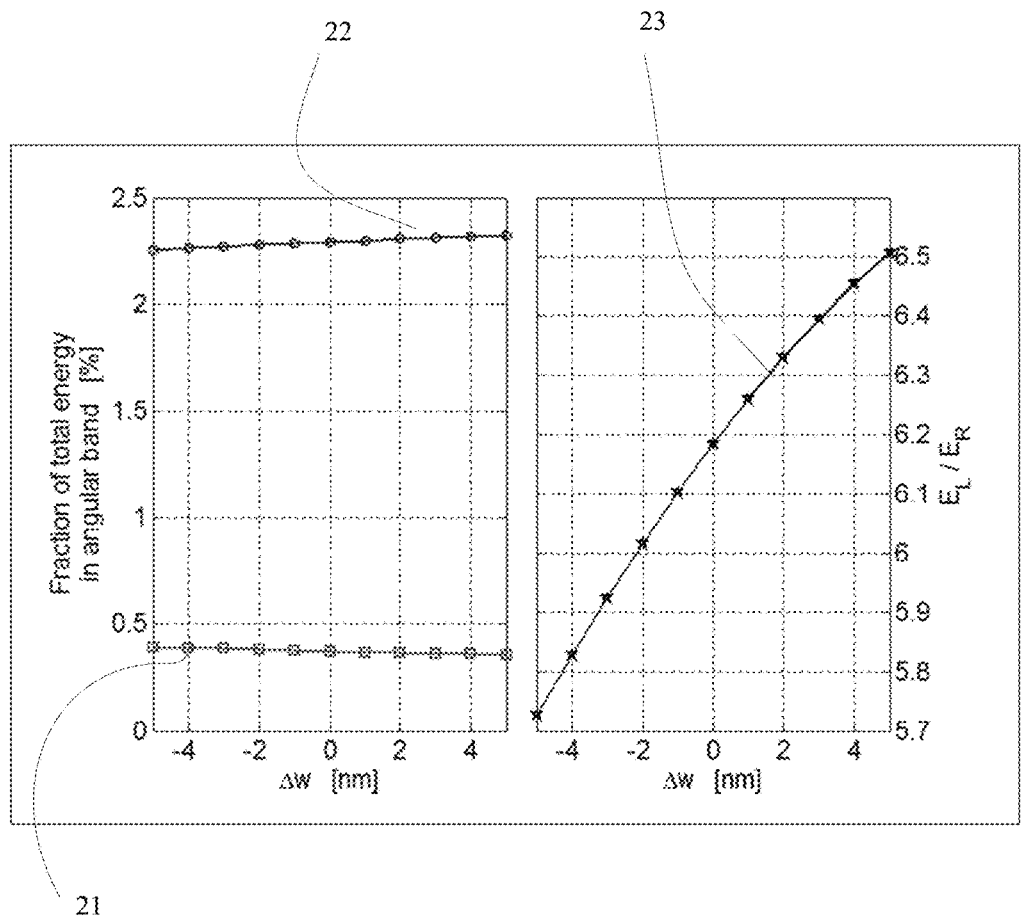
FIG. 8 shows the fraction of total scattered (diffracted) energy detected by two detectors based on a numerical simulation, according to an embodiment of the invention.

FIG. 8 shows the fraction of total scattered (diffracted) energy detected by the two detectors having fields of view 51 and 52 of FIG. 6, based on a numerical simulation.

The signals are plotted as functions of the slit's height (Δw in the x-label of the plot). Signal 21 corresponds to the field of view 51 of FIG. 6, and signal 22 corresponds to the field of view 52. The ratio between the two signals 22 and 21 is plotted on the right panel of FIG. 8, and indicates that a sensitivity to about 1 nm height variations is possible.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of step in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described steps are merely illustrative. The multiple may be combined into a single step, a single step may be distributed in additional steps and steps may be executed at least partially overlapping in time. Moreover, alternative embodiments may include multiple instances of a particular step, and the order of steps may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for determining a distance between a near field sensor and a substrate, the method comprising:
    creating a diffraction pattern by illuminating, with a beam of coherent radiation having a wavelength that does not exceed twenty nanometers, a slit that is formed between the substrate and an opaque element;
    detecting, by a detector, multiple portions of the diffraction pattern and generating detection signals indicative of the multiple portions of the diffraction pattern;
    processing the detection signals to determine a height of the slit; and
    determining the distance between the near field sensor and the substrate based upon (a) the height of the slit, and (b) a relationship between the height of the slit and a location of the near field sensor.

2. The method according to claim 1, wherein the beam of coherent radiation is an x-ray beam.

3. The method according to claim 1, wherein the generating of the detection signals comprises generating multiple detection signals for multiple portions of a diffraction lobe.

4. The method according to claim 3 wherein the processing of the detection signals comprises comparing detection signals related to different portions of the diffraction lobe.

5. The method according to claim 3 wherein the diffraction lobe is a main diffraction lobe of the diffraction pattern.

6. The method according to claim 1 wherein the multiple portions of the diffraction pattern are sensed by multiple sensing elements, wherein two or more sensing elements of the multiple sensing elements cover different reflection angular ranges.

7. The method according to claim 1, wherein the height of the slit ranges between 20 and 150 nanometers.

8. The method according to claim 1, wherein an incidence angle of the beam of coherent radiation does not exceed two degrees.

9. The method according to claim 1, wherein an incidence angle of the beam of coherent radiation is smaller than a minimal total internal reflection angle for all materials of the substrate.

10. The method according to claim 1 further comprising controlling a height of the near field sensor in response to the distance between the near field sensor and the substrate.

11. A measurement device, comprising:
    a near field sensor;
    an opaque element; and
    a height measurement module;
    wherein the height measurement module is configured to:
        create a diffraction pattern by illuminating, with a beam of coherent radiation having a wavelength that does not exceed twenty nanometers, a slit formed between a substrate and the opaque element;
        detect multiple portions of the diffraction pattern;
        generate detection signals that are indicative of the multiple portions of the diffraction pattern;
        process the detection signals to determine a height of the slit; and
        determine a distance between the near field sensor and the substrate based upon (a) the height of the slit, and (b) a relationship between the height of the slit and a location of the near field sensor.

12. The measurement device according to claim 11, wherein the beam of coherent radiation is an x-ray beam.

13. The measurement device according to claim 11, wherein the generating of the detection signals comprises generating multiple detection signals for multiple portions of a diffraction lobe.

14. The measurement device according to claim 13 wherein the height measurement module is configured to compare detection signals related to different portions of the diffraction lobe.

15. The measurement device according to claim 11 further comprising a controller that is arranged to control a height of the near field sensor in response to the distance between the near field sensor and the substrate.

* * * * *